United States Patent Office 3,157,718
Patented Nov. 17, 1964

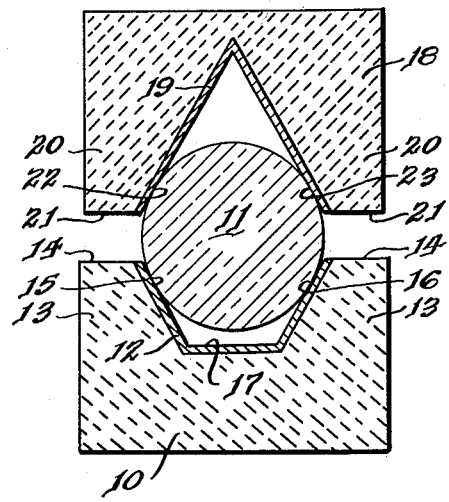
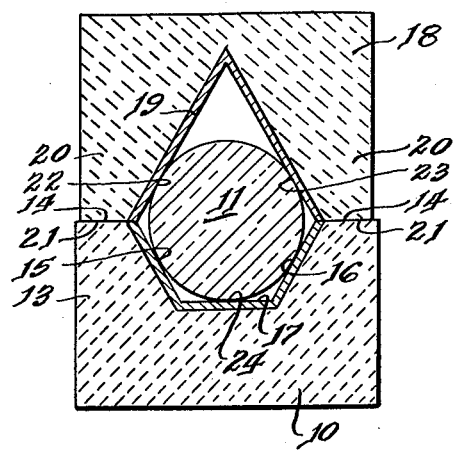
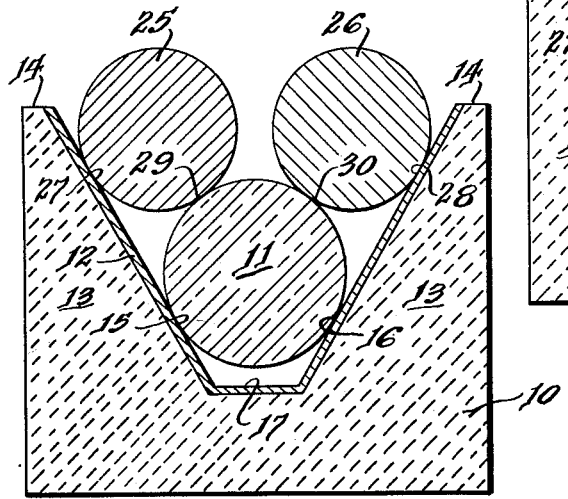
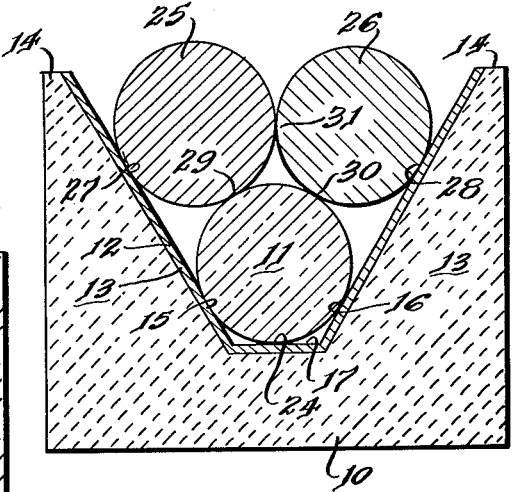

3,157,718
METHOD OF SINTERING CERAMIC SHAPES
William J. O'Leary, Claymont, Del., and Eugene A. Fisher, Fostoria, Ohio, assignors to the United States of America as represented by the United States Atomic Energy Commission
Filed Nov. 14, 1962, Ser. No. 237,778
2 Claims. (Cl. 264—57)

The invention relates to a novel method of controlling the straightness and roundness during the firing, including sintering, of elongated ceramic shapes, more particularly for the control of straightness and roundness of rods and tubes for use in nuclear reactors, and to an apparatus therefor.

Ceramic, cermet and similar nuclear reactor fuel elements, blanket elements, and control elements must be shaped to extremely close tolerances in order to meet the exacting requirements of reactor design. Up until the present the only practical method for maintaining the straightness and roundness of elongated ceramic rods and tubes during firing was by suspending them in an upright position. This is unsatisfactory for two reasons; green ceramics have a tendency to elongate under their own weight and even to neck down near the top, and the difference in temperature between the top and bottom regions of the furnace to which the firing is done results in a lack of uniformity which leads to warping.

Firing in a horizontal position can only be done successfully with shapes of limited length while tightly confined in some manner such as by a uniaxial ram press, an isostatic pressing medium or the like. These methods cannot be applied to an extruded shape since it would be deformed thereby. On the other hand, if an extruded shape is fired or sintered in a horizontal position without being confined it tends to flatten due to its plastic characteristics. Nor is the trouble remedied by placing the shape in a mold since the green ceramic shrinks during the process and the mold becomes too large to maintain the desired shape.

It is, accordingly, the general object of the invention to provide a method of controlling the straightness and roundness of elongated ceramic, cermet and powdered metal extruded shapes during firing, including sintering, in a horizontal position.

It is a more particular object to provide an apparatus for carrying out the above method in a convenient, economical manner.

Other objects will appear as the description proceeds.

According to the invention an extruded rod, tube, or similar elongated shape of ceramic, cermet or powdered metal material is fired or sintered with two initial supports from below along lines parallel with the axis of the shape and symmetrically spaced about the lower half of its circumference, and as the firing progresses and the diameter of the shape decreases due to shrinkage, a third support is provided along the lowest line of its circumference. Meanwhile, from above a plurality of downwardly compressive forces is applied to the shape to maintain its straightness and roundness, which compressive forces are abated, in whole or in part, as the shape shrinks in diameter as the firing proceeds.

Attention is now directed to the drawings FIG. 1 of which is a sectional view of a green shape in the embodiment of our invention employing upper and lower troughs.

FIG. 2 is a sectional view of the same embodiment as in FIG. 1 after the shape has shrunk to its final diameter during firing.

FIG. 3 is a sectional view of a green shape in the embodiment of our invention employing rods rather than an inverted trough to supply the downwardly compressive forces.

FIG. 4 is a sectional view of the same embodiment as in FIG. 3 after the shape has shrunk to its final diameter during firing.

Referring to FIG. 1, numeral 10 designates a ceramic block-like truncated V-shaped trough supporting a shape 11 in its green condition. Trough 10 has a metal lining 12 to prevent the trough 10 from sticking or reacting with the shape 11; it has sides 13 terminating in ends 14. It supports the shape 11 symmetrically around the lower half of its diameter at points 15 and 16, but the shape is out of contact with the plane of truncation 17 across the bottom. Since points 15 and 16 are points in lines perpendicular to the plane of the paper and parallel with the axis of shape 11, it is to be understood that the support of shape 11 is therefore actually along these lines rather than merely at the points 15 and 16.

The numeral 18 designates an inverted V-shaped trough resting in a balanced condition on the upper half of the circumference of shape 11. It has a metal lining 19 and sides 20 terminating in ends 21, and it exerts downwardly compressive forces upon the shape 11 at points 22 and 23 which are symmetrically disposed about the upper half of the circumference of shape 11. Points 22 and 23 are points in lines perpendicular to the plane of the paper and parallel with the axis of the shape 11, and hence trough 18 exerts two downwardly compressive forces throughout the entire length of shape 11 during firing, thereby maintaining its straightness and roundness during the process.

In FIG. 2 it will be noted that shape 11 has shrunk in diameter from its green condition in FIG. 1, and that the ends 14 of trough 10 and ends 21 of trough 18 have come together, thereby abating the downwardly compressive forces on the shape 11 at points 22 and 23. Also, in addition to the initial supports at 15 and 16 in lower trough 10, shape 11 is now given a third support by the plane of truncation 17 at point 24 which is at the lowest point on the circumference of shape 11. Point 24 is, of course, a point in a line perpendicular to the plane of the paper and parallel with the axis of shape 11.

In FIG. 3 trough 10 holds shape 11 in its green state as in FIG. 1, and is identical with FIG. 1 in all other respects, having metal lining 12, sides 13, ends 14, points of contact 15 and 16, and plane of truncation 17. Above the shape 11 are two metal rods 25 and 26 which rest against the sides 13 and 14 of the trough 10 at points 27 and 28 and against the shape 11 at points 29 and 30. Since points 29 and 30 are in a line parallel with the axis of the shape 11, rods 25 and 26 exert downwardly compressive forces through the entire length of shape 11 along these lines, thereby maintaining its straightness and roundness during firing.

In FIG. 4, due to shrinkage of the shape 11 during firing, rods 25 and 26 have come together at point 31 and along their lengths, thereby decreasing and abating their pressure on shape 11 at points 29 and 30. Again, it will be noted that the two lines of support at 15 and 16 have become three with the addition of support by the plane of truncation at 17.

Subsidiary to the main aspects of our invention just outlined, we have discovered a method of conveniently and accurately determining the width of the plane of truncation 17 of the lower trough 10. It would, of course, be theoretically possible to do this by direct measurements, but this is difficult and susceptible to errors of various kinds. In order to use our method all that is necessary is to measure the diameter of the fired shape, which can be easily and accurately done with calipers, and to determine the angle included by the V of the trough. With these two pieces of information, the width of the plane of truncation can then be found by means of the following formula:

$$W_{pt} = 2r \left( \sin\theta - \frac{1-\cos\theta}{\tan\theta} \right)$$

where $W_{pt}$ = the width of the plane of truncation 17
$r$ = the radius of the fired shape 11
$\theta = 90° - \frac{1}{2}$ the included angle of the V of the trough 10.

The width of the truncating plane 17 being known the trough may be accurately ground, or otherwise shaped, to this dimension and the desired three-way tangential support is thereby attained.

In carrying out the invention the materials used for the troughs 10 and 18, metal linings 12 and 19, and rods 25 and 26, will depend on the nature of the ceramic, cermet or powdered metal shape 11 being fired or sintered. For firing extrusions of fuel rods predominantly of $UO_2$ we prefer to use as material for the troughs the ceramic mullite, which is substantially $3Al_2O_3 \cdot 2SiO_2$. As a metal lining for the troughs, and as rods, we prefer materials of the class consisting of molybdenum and molybdenum base alloys since these do not react with $UO_2$.

The metal linings of the troughs may be sheet metal, or sprayed on. We prefer sprayed on linings, which may then be ground to insure accuracy.

*Example*

About 900 g. of urania were milled in ethyl alcohol with pebbles of 96% alumina for 2 hours in a 1½ quart alumina ball mill. After milling the batch was emptied into a glass dish and the alcohol was evaporated at about 55° C. The dried urania was then mixed on a sheet of plastic with hydrated methylcellulose and hydrated ammonium alginate as plasticizers in such proportions that, after mixing, the plasticizers each made up about 0.63 percent by weight of the entire mixture, or about 1.26 weight percent together. The resulting mixture was then homogenized by feeding it several times through a hand-operated food grinder having ⅙ inch perforations.

The resulting worm-like homogenized feed stock was then de-aired for 5 minutes at a pressure of 1–2 in. Hg and then extruded in a small piston extrusion machine having a tungsten carbide extrusion die with an opening of 0.680 in. in diameter into lengths of 6 and 8 inches. The lengths were dried in aluminum V-shaped trays for 24 hours at room temperature, and for a second 24 hours at 55° C.

The dried lengths were then placed in truncated V-shaped troughs such as those shown in FIGS. 1–4, made of mullite with linings of sprayed molybdenum about 25 mils thick. Some of the lengths were covered with inverted V-shaped troughs of mullite lined with moylbdenum such as those shown in FIGS. 1 and 2, and others with two molybdenum rods about ½ inch in diameter, as shown in FIGS. 3 and 4.

The troughs containing the shape were then placed in an electric furnace and fired at about 2960° F. for about one hour. After cooling the shapes were found to have a diameter of about 0.5 in. and were acceptably straight and round. Their chemical composition was substantially pure $UO_2$.

It will be understood that the invention is not to be limited to the details given herein but that it may be modified within the scope of the appended claims.

What is claimed is:

1. A method of maintaining the straightness and roundness during firing of an elongated circular shape, comprising placing it within an upright truncated-V-shaped trough thereby supporting it along the two straight parallel lines where the circumference of the shape rests against sides of the trough, and as the diameter of the shape decreases to its minimum due to shrinkage during the firing, supporting it from below along a third straight line parallel with its axis formed by contact of its circumference with the bottom of the trough; meanwhile placing above the shape an inverted truncated-V-shaped trough, thereby exerting downwardly compressive forces along the two straight parallel lines where the sides of the inverted trough rest against the circumference of the shape, and as the diameter of said shape decreases to its minimum due to shrinkage during the firing, supporting the outer edges of the inverted V-shaped trough on those of the upright trough, thereby abating the downwardly compressive forces exerted thereby.

2. A method of maintaining the straightness and roundness during firing of an elongated circular shape, comprising placing it within an upright truncated-V-shaped trough thereby supporting it along the two straight parallel lines where the circumference of the shape rests against sides of the trough, and as the diameter of the shape decreases to its minimum due to shrinkage during firing, supporting it from below along a third line parallel with its axis formed by contact of its circumference with the bottom of the trough; meanwhile exerting from above a plurality of downwardly compressive forces along straight lines parallel with its axis formed by contact of its circumference with a plurality of right circular circumferences of straight rods of such diameter that, as the diameter of the shape decreases to its minimum due to shrinkage during firing, the rods nest together, thereby abating said downwardly compressive forces.

References Cited in the file of this patent

UNITED STATES PATENTS

| | | |
|---|---|---|
| 263,757 | Brush | Sept. 5, 1882 |
| 1,206,370 | Pike | Nov. 28, 1916 |
| 3,026,595 | Ludowici | Mar. 27, 1962 |
| 3,091,014 | Smoot et al. | May 7, 1962 |